(12) United States Patent
Xiao et al.

(10) Patent No.: US 11,372,478 B2
(45) Date of Patent: Jun. 28, 2022

(54) HEAD MOUNTED DISPLAY

(71) Applicant: HTC Corporation, Taoyuan (TW)

(72) Inventors: Bo-Wen Xiao, Taoyuan (TW); Fu-Cheng Fan, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 17/102,438

(22) Filed: Nov. 24, 2020

(65) Prior Publication Data

US 2021/0341999 A1 Nov. 4, 2021

Related U.S. Application Data

(60) Provisional application No. 62/960,710, filed on Jan. 14, 2020.

(51) Int. Cl.

| G06F 3/01 | (2006.01) |
|---|---|
| G02B 27/00 | (2006.01) |
| G09G 3/00 | (2006.01) |
| H04N 5/235 | (2006.01) |
| H04N 9/31 | (2006.01) |

(52) U.S. Cl.
CPC ......... *G06F 3/013* (2013.01); *G02B 27/0037* (2013.01); *G02B 27/0081* (2013.01); *G09G 3/001* (2013.01); *H04N 5/2352* (2013.01); *H04N 9/3176* (2013.01); *H04N 9/3194* (2013.01); *G09G 2320/0686* (2013.01); *G09G 2354/00* (2013.01)

(58) Field of Classification Search
CPC . G06F 3/013; G02B 27/0037; G02B 27/0081; G02B 27/0172; G02B 27/0093; G02B 27/0179; G02B 2027/0187; G09G 3/001; G09G 2320/0686; G09G 2354/00; H04N 5/2352; H04N 9/3176; H04N 9/3194; H04N 5/2354

See application file for complete search history.

(56) References Cited

U.S. PATENT DOCUMENTS

| 10,095,307 B2 * | 10/2018 | Raffle | G02B 27/0172 |
| 2014/0375790 A1 * | 12/2014 | Robbins | G02B 27/017 348/78 |
| 2021/0041948 A1 * | 2/2021 | Berkner-Cieslicki | G06F 3/013 |
| 2021/0176383 A1 * | 6/2021 | Kim | H04N 5/332 |

* cited by examiner

*Primary Examiner* — Michael E Teitelbaum
(74) *Attorney, Agent, or Firm* — JCIPRNET

(57) ABSTRACT

A head mounted display, including at least one display, an image capture device, a light beam generator, and an optical compensation element, is provided. The display has an open area and generates at least one image light beam. The image capture device is disposed by overlapping with the display corresponding to the open area. The image capture device is configured to capture a target area image through the open area. The light beam generator is configured to project at least one light beam to a target area. The target area reflects the light beam to generate at least one reflection light beam. The optical compensation element is configured to convert a transmission direction of the image light beam and enable the reflection light beam to be directly transmitted to the image capture device.

9 Claims, 15 Drawing Sheets

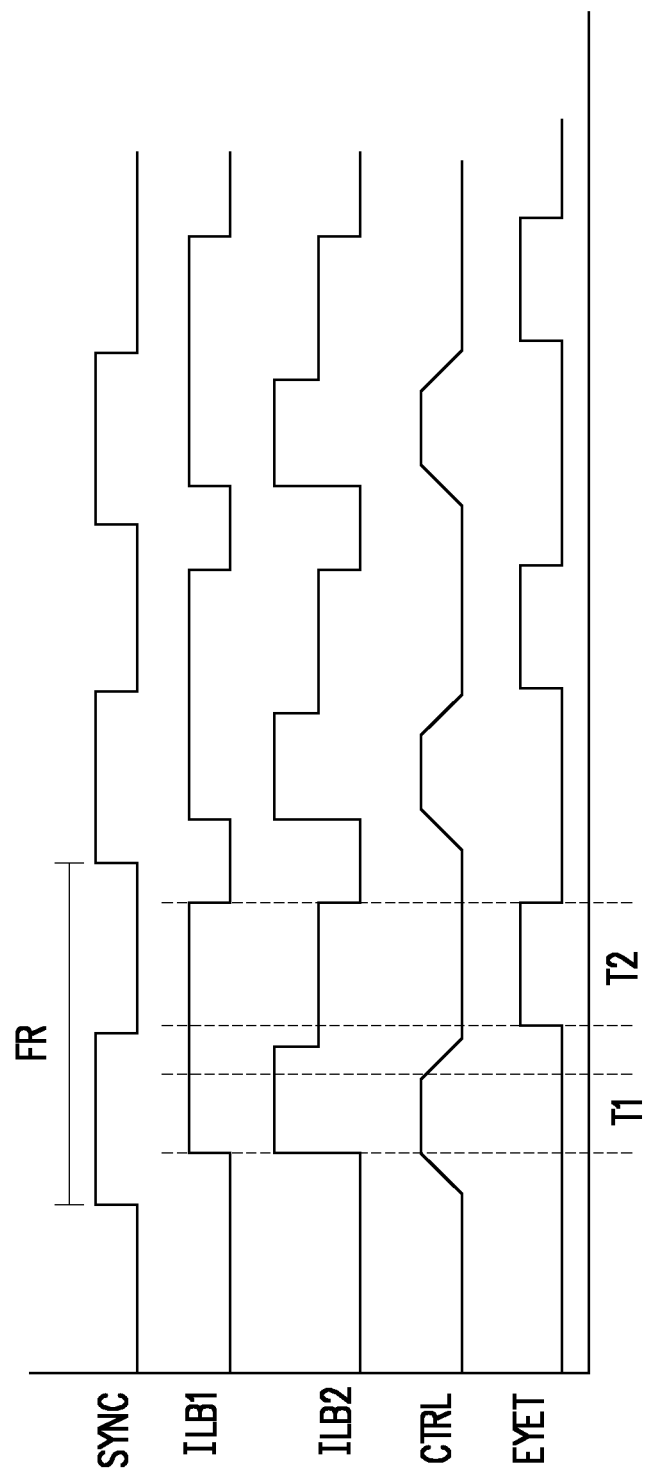

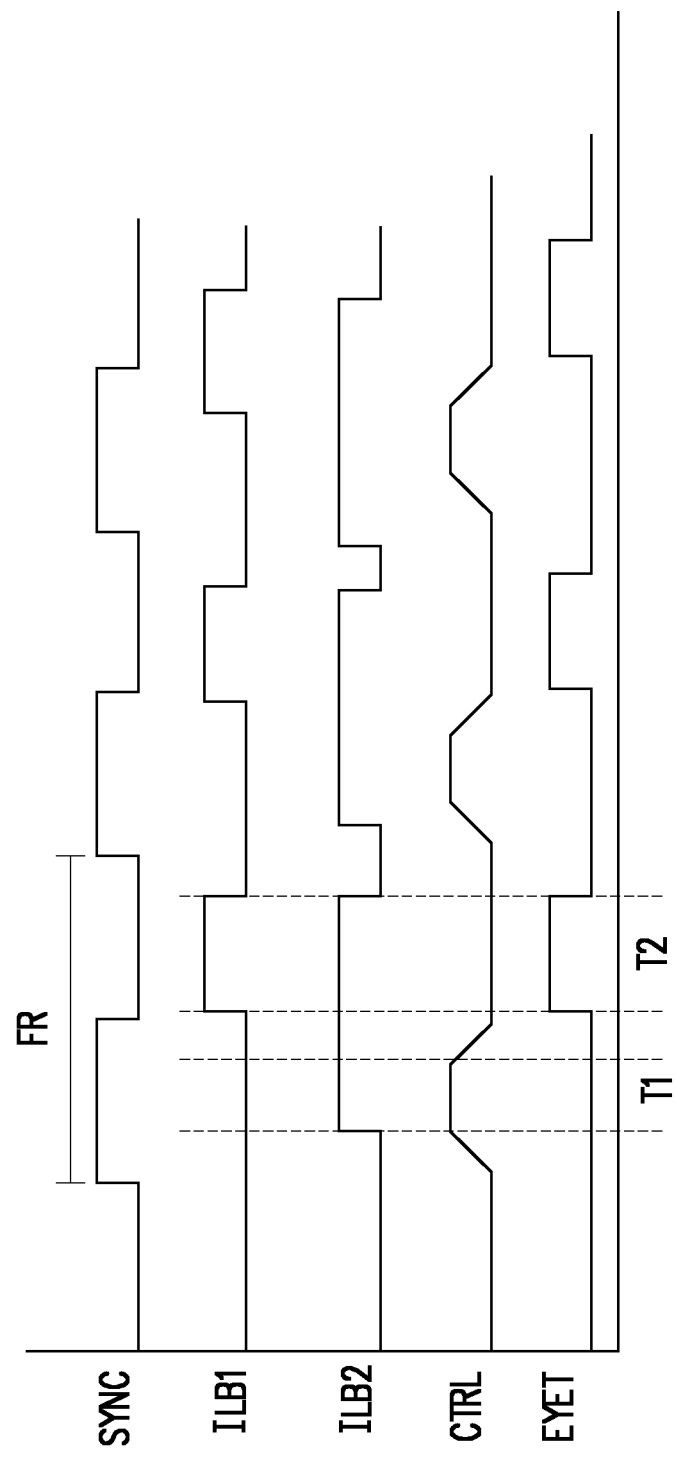

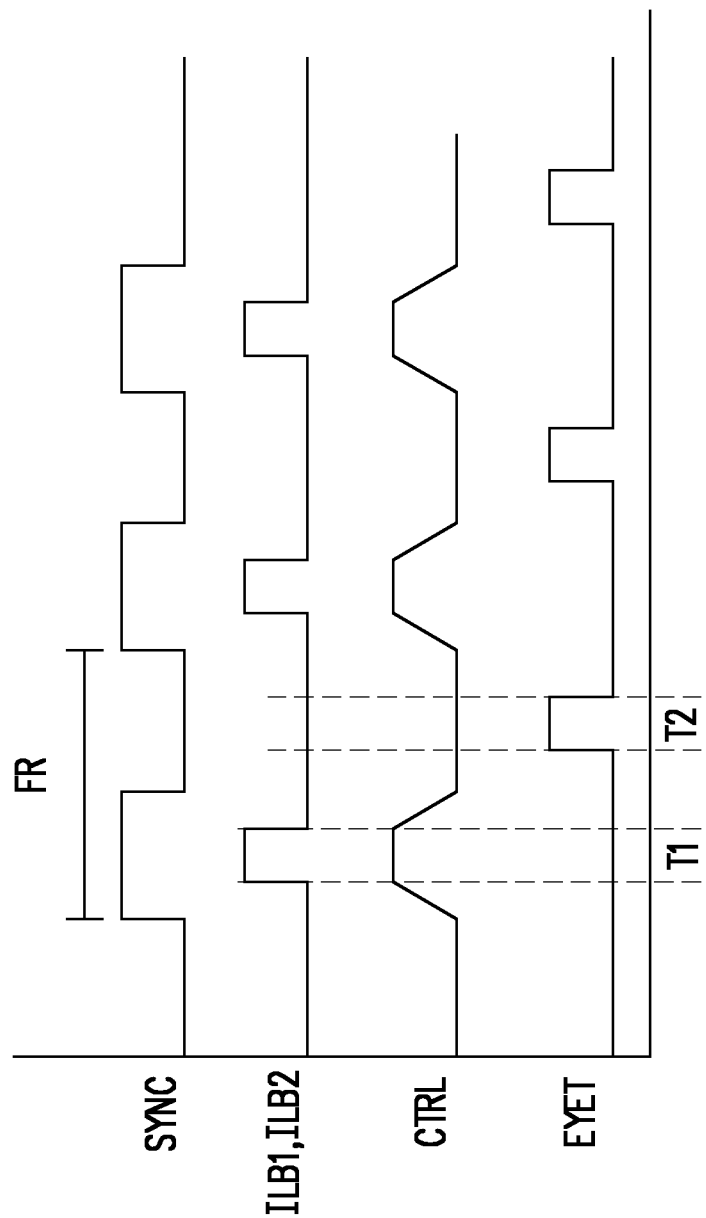

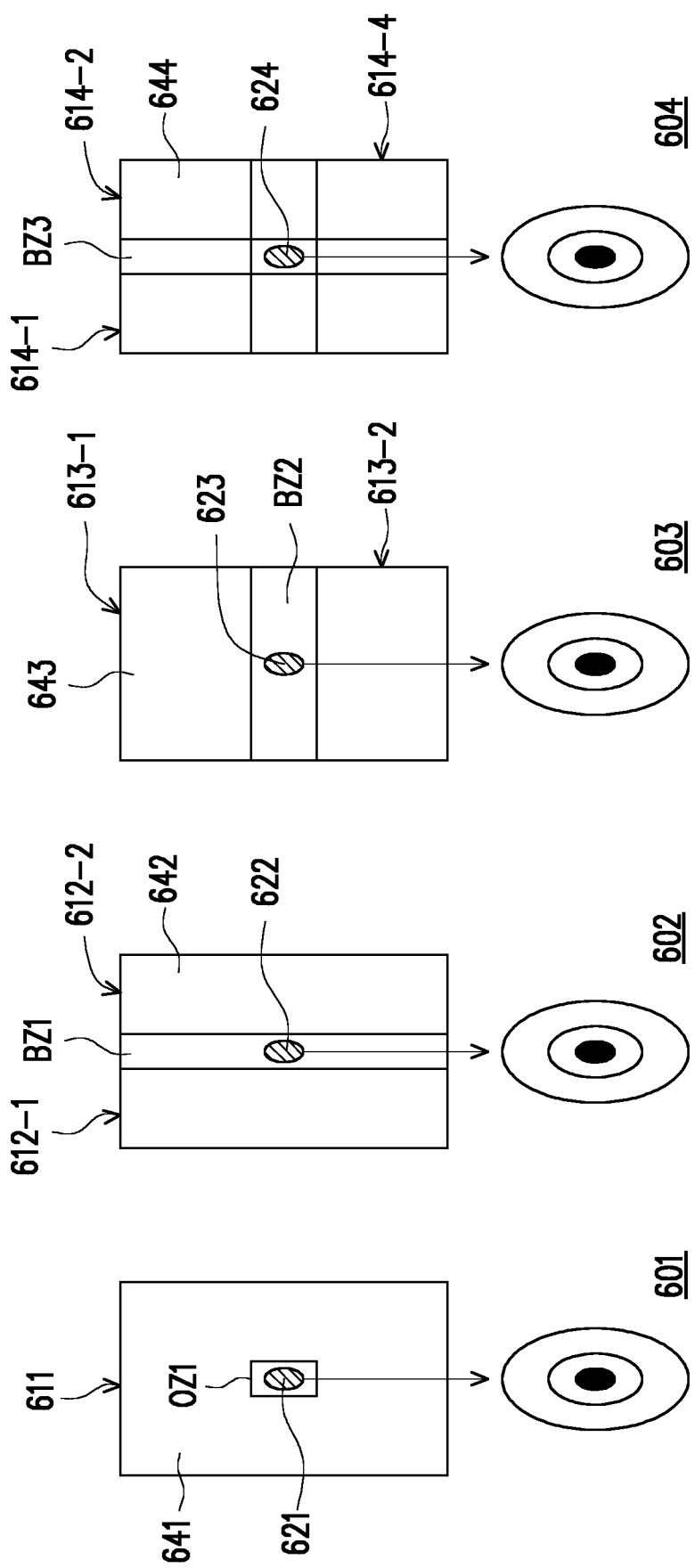

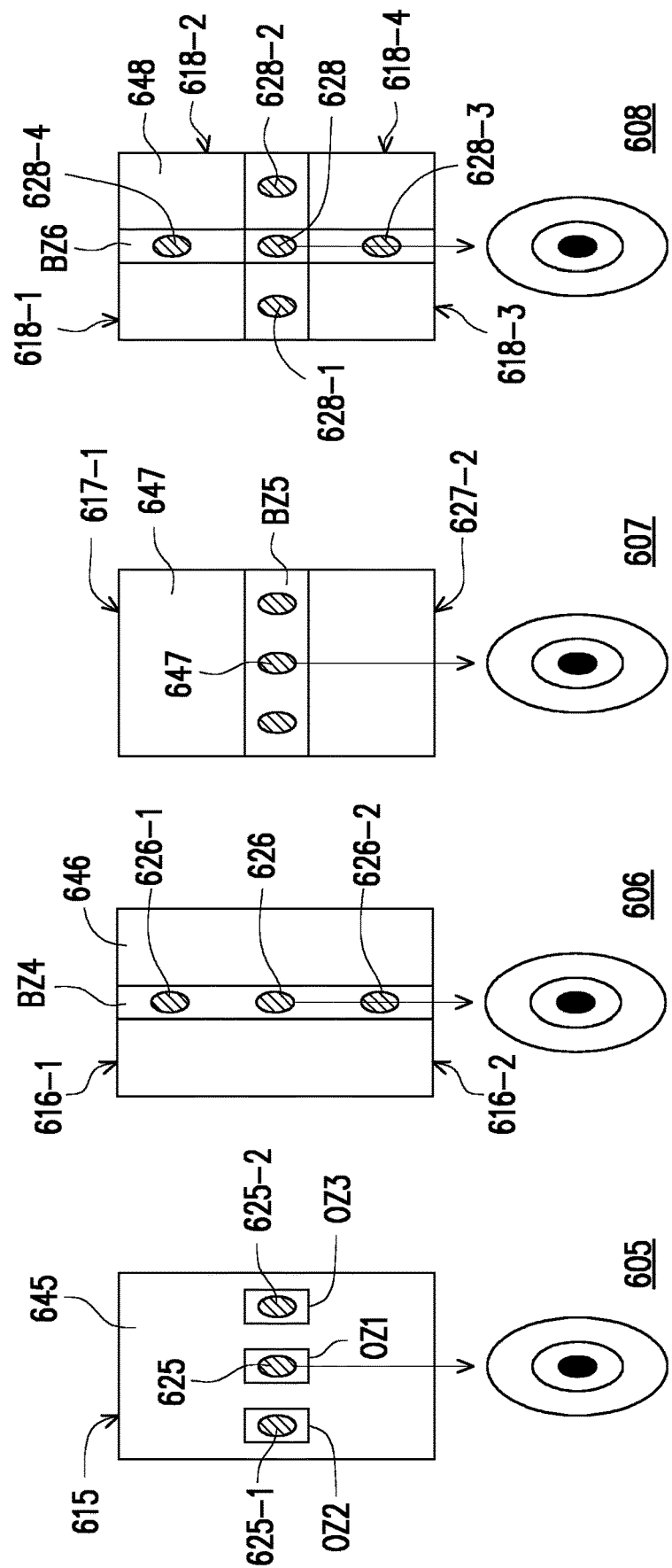

HEAD MOUNTED DISPLAY

CROSS-REFERENCE TO RELATED APPLICATION

This application claims the priority benefit of U.S. Provisional Application No. 62/960,710, filed on Jan. 14, 2020. The entirety of the above-mentioned patent application is hereby incorporated by reference herein and made a part of this specification.

BACKGROUND

Technical Field

The disclosure relates to a head mounted display, and particularly relates to a head mounted display that can improve the accuracy of an eyeball tracking action.

Description of Related Art

In the prior art, the optical element is often disposed in the head mounted display, so that the image light beam for displaying an image may be transmitted to the eyes of the user. However, disposing such optical element often causes the transmission path of the infrared light beam for executing an eyeball tracking action to deflect, which causes the infrared camera to be unable to effectively capture the eyeball image of the user and reduces the accuracy of eyeball tracking.

SUMMARY

The disclosure provides a head mounted display, which can improve the accuracy of an eyeball tracking action.

The head mounted display of the disclosure includes at least one display, a first image capture device, a light beam generator, and an optical compensation element. The display has an open area and generates at least one image light beam. The first image capture device is disposed by overlapping with the display corresponding to the open area and captures a target area image on the target area through the open area. The light beam generator is configured to project at least one light beam to the target area. The target area reflects the light beam to generate at least one reflection light beam. The optical compensation element is disposed between the display and the target area. The optical compensation element is configured to convert a transmission direction of the image light beam and enable the reflection light beam to be directly transmitted to the first image capture device.

Based on the above, the head mounted display according to the embodiment of the disclosure is disposed with an optical compensation element, so that the image light beam may be converted into a collimated light beam to be transmitted to the eyeball of the user, and the eyeball image of the target area may directly penetrate the optical compensation element to be transmitted to the image capture device. In this way, the image capture device may accurately obtain the eyeball image of the user while taking into account the visual quality of the displayed image to maintain the accuracy of the eyeball tracking action.

BRIEF DESCRIPTION OF THE DRAWINGS

FIG. 3C is a schematic diagram of action waveforms of the head mounted display according to the embodiment of FIG. 3A and FIG. 3B of the disclosure.

FIG. 4A to FIG. 4C are schematic diagrams of another action mode of the head mounted display according to an embodiment of the disclosure.

FIG. 5A to FIG. 5C are schematic diagrams of another action mode of the head mounted display according to an embodiment of the disclosure.

FIG. 6A to FIG. 6H are respectively schematic diagrams of multiple configurations of a display, an image capture device, and an optical compensation element of the head mounted display according to an embodiment of the disclosure.

DETAILED DESCRIPTION OF DISCLOSED EMBODIMENTS

Figure 1:
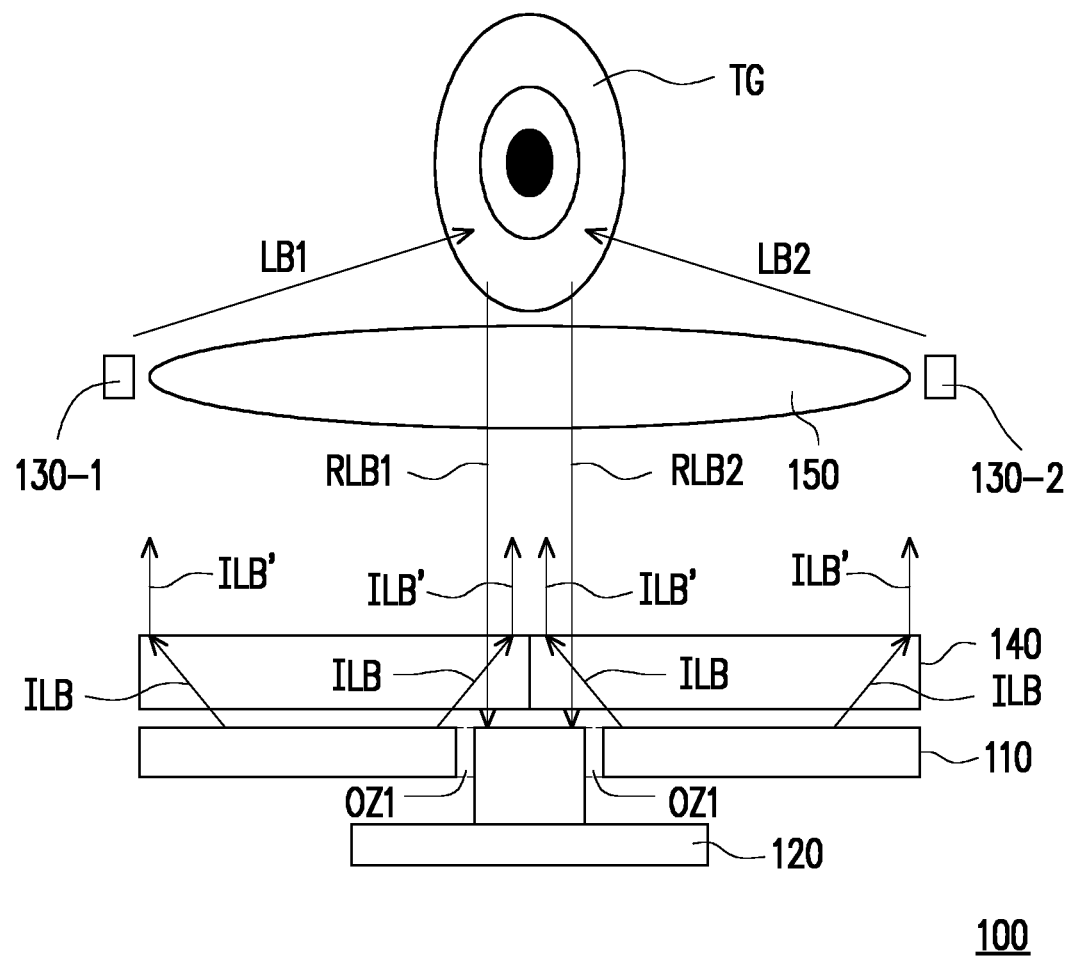
FIG. 1 is a schematic diagram of a head mounted display according to an embodiment of the disclosure.

Please refer to FIG. 1. FIG. 1 is a schematic diagram of a head mounted display according to an embodiment of the disclosure. A head mounted display 100 includes a display 110, an image capture device 120, light beam generators 130-1 and 130-2, an optical compensation element 140, and a lens set 150. In the embodiment, the display 110 is configured to generate an image light beam ILB. The display 110 has an open area OZ1. The image capture device 120 is disposed by overlapping with the display 110 corresponding to the open area OZ1. The display 110 is configured to capture a target area image on a target area TG through the open area OZ1. In the embodiment, the target area TG may be the eyeball area of the user, and the target area image on the target area TG may be the eyeball image of the user.

In the embodiment, the light beam generators 130-1 and 103-2 may be respectively disposed on two sides of the lens set 150. The light beam generators 130-1 and 103-2 respectively generate light beams LB1 and LB2, and transmit the light beams LB1 and LB2 to the target area TG. The target area TG reflects the light beams LB1 and LB2 to respectively generate reflection light beams RLB1 and RLB2, and transmits the reflection light beams RLB1 and RLB2 to the optical compensation element 140.

In the embodiment, the light beam generators 130-1 and 103-2 may be infrared emitters, and the number of light beam generators 130-1 and 103-2 may be one or more, and there is no fixed limit. In addition, the image capture device 120 may be a camera, such as an infrared camera that may sense an infrared image.

In addition, the optical compensation element 140 is disposed between the display 110 and the target area TG. The optical compensation element 140 is configured to convert the transmission direction of the image light beam ILB, and generate an image light beam ILB', which is a collimated light beam, to transmit to the lens set 150. On the other hand, the optical compensation element 140 may enable the reflection light beams RLB1 and RLB2 transmitted from the target area TG to be directly transmitted to the image capture device 120 without changing the transmission direction. In this way, the image capture device 120 may effectively capture the target area image to maintain the accuracy of an eyeball tracking action.

Please note here that, in the embodiment of the disclosure, the optical compensation element 140 may be a diffractive optics element. The diffractive optics element may determine whether to change the wavefront of an incident light wave according to the frequency band of the incident light wave, so as to change the path of the incident light. In the embodiment, the optical compensation element 140 may change the transmission path of the image light beam ILB, but does not change the transmission paths of the reflection light beams RLB1 and RLB2.

By the way, in the embodiment, the distance between the optical compensation element 140 and the lens set 150 is greater than the distance between the optical compensation element 140 and the display 110.

Figure 2:
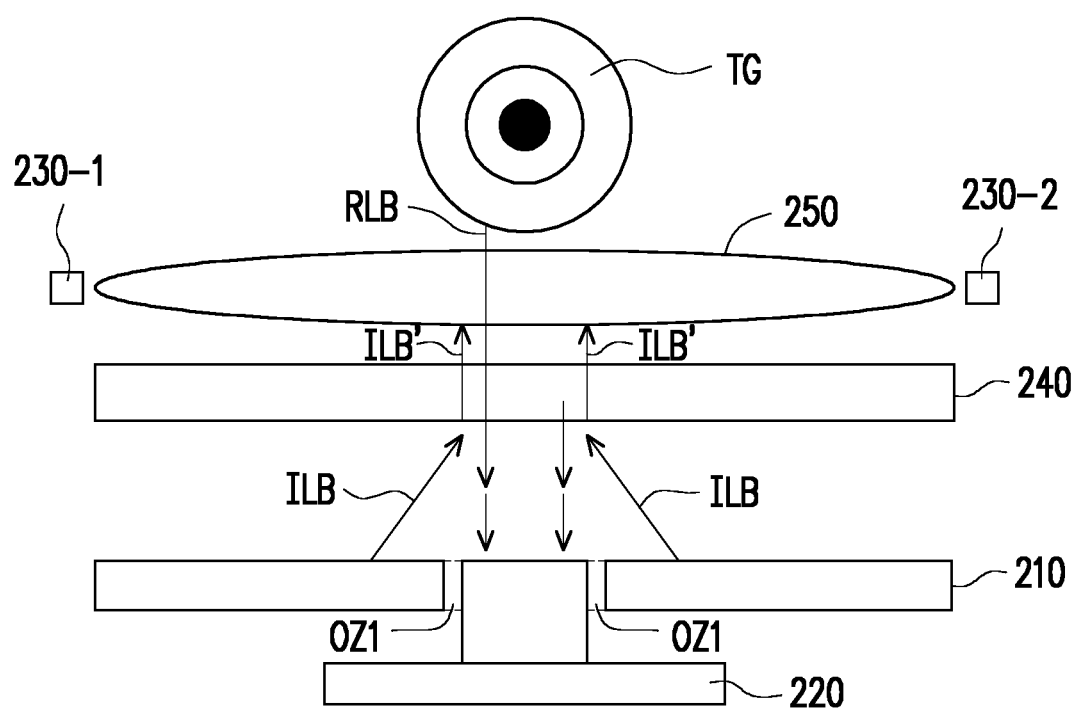
FIG. 2 is a schematic diagram of a head mounted display according to another embodiment of the disclosure.

Please refer to FIG. 2 for the following. FIG. 2 is a schematic diagram of a head mounted display according to another embodiment of the disclosure. A head mounted display 200 includes a display 210, an image capture device 220, light beam generators 230-1 and 230-2, an optical compensation element 240, and a lens set 250. The display 210 is configured to generate an image light beam ILB. The optical compensation element 240 is configured to change the transmission path of the image light beam ILB and generate an image light beam ILB' to be transmitted to a target area TG. A reflection light beam RLB generated on the target area TG is directly transmitted to an image capture device 220 in an open area OZ1 of the display 210 through the optical compensation element 240. In this way, the image capture device 220 may effectively capture a target area image.

Different from the foregoing embodiment, in the embodiment, the distance between the optical compensation element 240 and the lens set 250 is less than the distance between the optical compensation element 240 and the display 210.

Figure 3A:
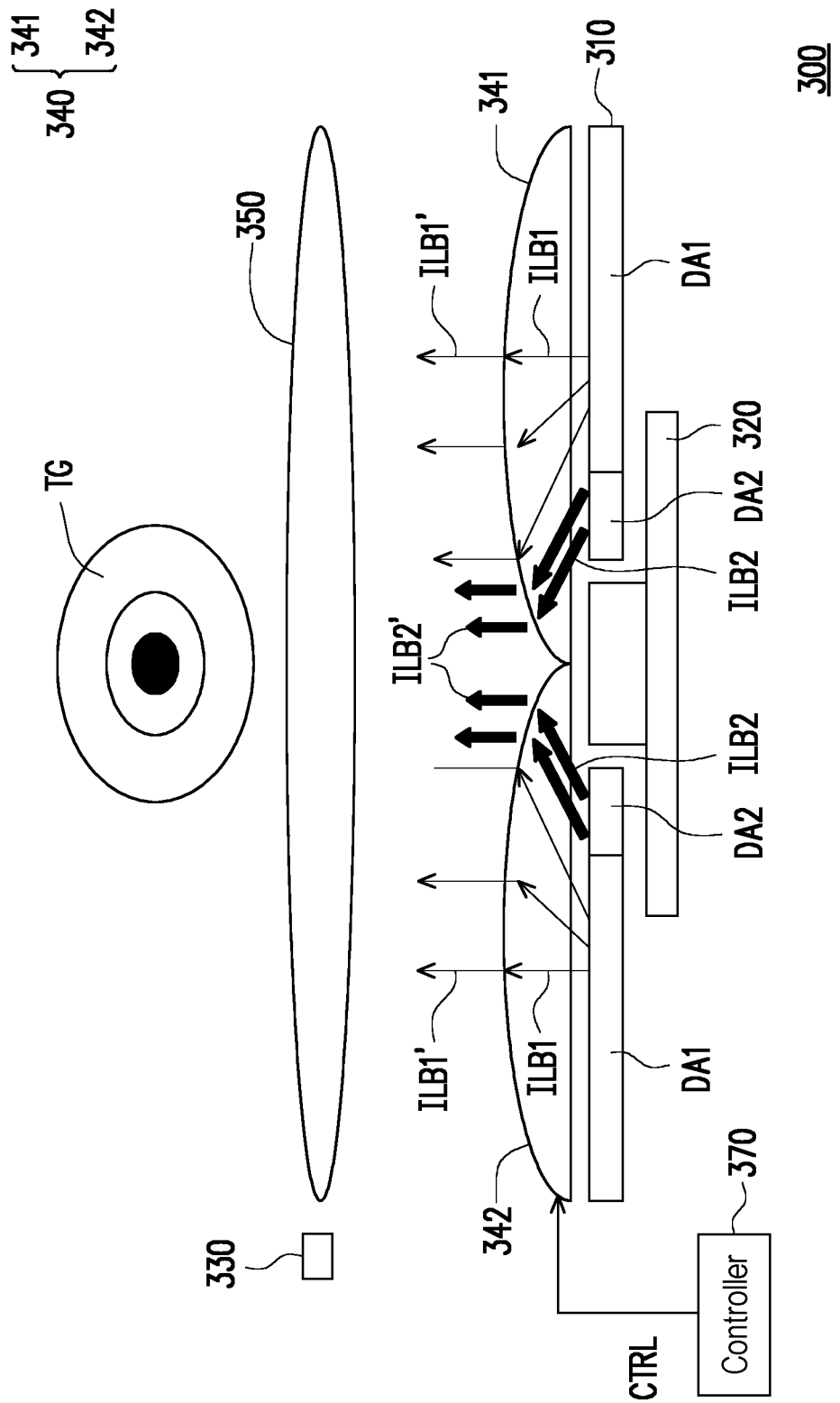
FIG. 3A and FIG. 3B are schematic diagrams of a head mounted display and an action thereof according to another embodiment of the disclosure.
Figure 3B:
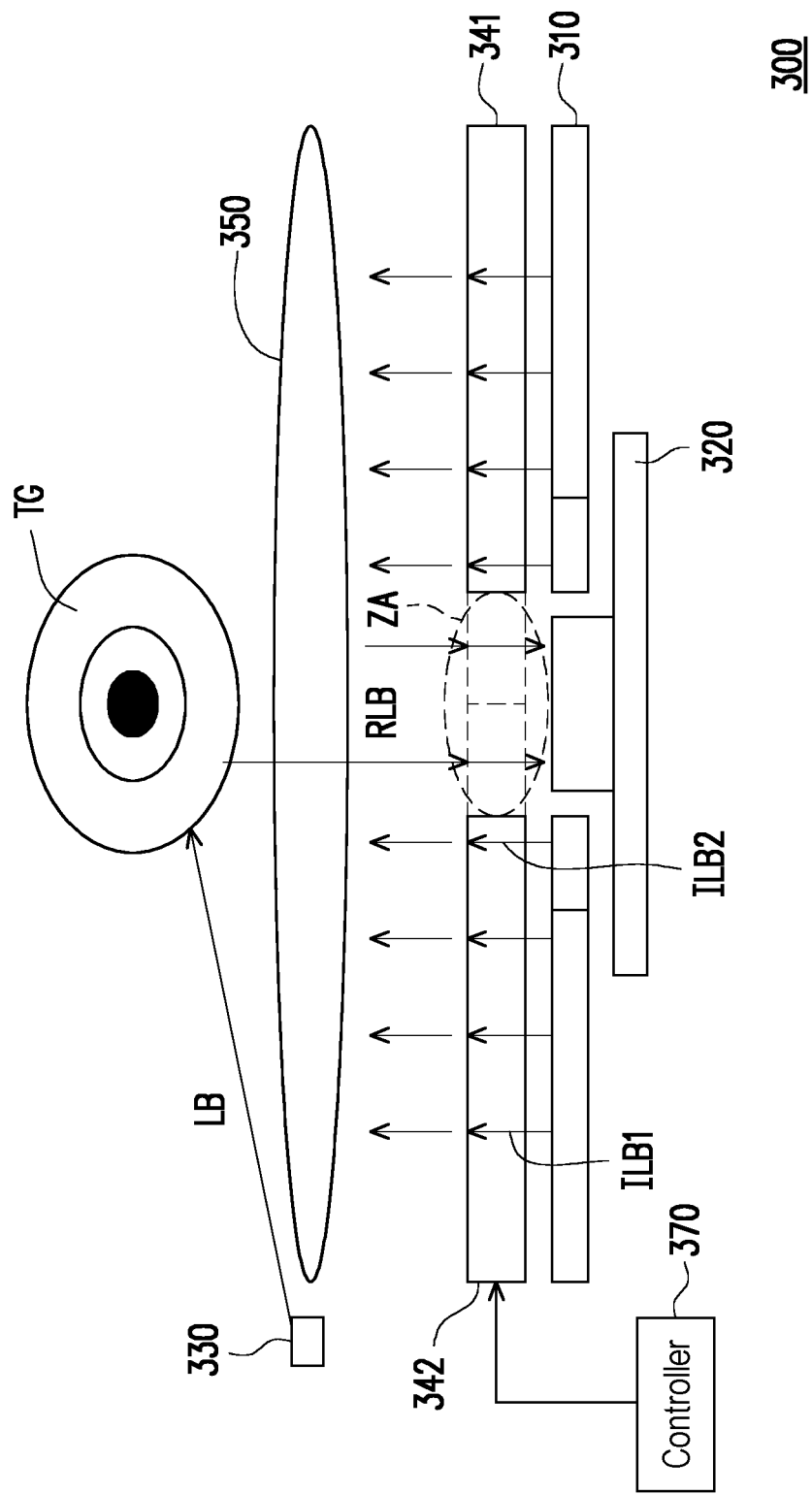

Please refer to FIG. 3A and FIG. 3B for the following. FIG. 3A and FIG. 3B are schematic diagrams of a head mounted display and an action thereof according to another embodiment of the disclosure. In FIG. 3A, a head mounted display 300 includes a display 310, an image capture device 320, a light beam generator 330, an optical compensation element 340, a lens set 350, and a controller 370. The display 310 has an open area, and the image capture device 320 is disposed in the open area and is disposed by overlapping with the display 310. In the embodiment, the display 310 may be divided into a first display area DA1 and a second display area DA2. The second display area DA2 is closer to the open area than the first display area DA1. The optical compensation element 340 includes a first portion 341 and a second portion 342.

In the embodiment, the optical compensation element 340 is a dynamic refractive optics element, and the shape thereof may be changed according to a control signal CTRL, which is an electrical signal. In the embodiment, during a first time interval, the first portion 341 and the second portion 342 of the first surface of the optical compensation element 340 facing the lens set 350 may be adjusted to curved surfaces according to the control signal CTRL, and the first portion 341 and the second portion 342 of the second surface of the optical compensation element 340 facing the display 310 may be maintained as planes. The control signal CTRL is provided by the controller 370.

At the same time, the brightness of an image light beam ILB2 generated by the second display area DA2 of the display 310 is twice the brightness of an image light beam ILB1 generated by the first display area DA1 of the display 310. At this time, the first portion 341 and the second portion 342 of the optical compensation element 340 adjust the transmission paths of the image light beam ILB1 and the image light beam ILB2 according to the curvature of the first surfaces, and transmit adjusted image light beams ILB1' and ILB2' to the lens set 350.

It is worth noting that, in the embodiment, during the first time interval, the light beam generator 330 and the image capture device 320 are turned off without executing any action.

Next, please refer to FIG. 3B. During a second time interval, the first portion 341 and the second portion 342 of the first surface of the optical compensation element 340 facing the lens set 350 may be adjusted to planes according to the control signal CTRL, and the first portion 341 and the second portion 342 of the second surface of the optical compensation element 340 facing the display 310 may be maintained as planes. At the same time, the brightness of the image light beam ILB2 generated by the second display area DA2 of the display 310 is the same as the brightness of the image light beam ILB1 generated by the first display area DA1 of the display 310. In addition, the light beam generator 330 starts to transmit a light beam LB to the target area TG. The target area TG may generate a reflection light beam RLB according to the light beam LB. The reflection light beam RLB may be directly transmitted to the image capture device 320 through an area ZA where the first portion 341 and the second portion 342 of the optical compensation element 340 are connected to each other.

Please note here that during the second time interval, the cross sections of the first portion 341 and the second portion 342 of the optical compensation element 340 are adjusted to rectangular shapes. Therefore, in the first portion 341 and the second portion 342 of the optical compensation element 340, the area ZA corresponding to the open area of the display 310 will not have the image light beams ILB1 and ILB2 passing through. The reflection light beam RLB may pass through the area ZA without interference to be transmitted to the image capture device 320.

In addition, during the second time interval, the image capture device 320 is activated to capture the target area image on the target area TG. The eyeball tracking action may be effectively executed through the position of the light spot generated by the reflection light beam RLB on the target area image.

Please refer to FIG. 3A to FIG. 3C at the same time for the following. FIG. 3C is a schematic diagram of action waveforms of the head mounted display according to the embodiment of FIG. 3A and FIG. 3B of the disclosure. An action of a head mounted display 300 may be executed according to a synchronous signal SYNC. Each period of the synchronous signal SYNC may define each frame period. During a first time interval T1 of the frame period FR, the voltage value of the control signal CTRL for controlling the optical compensation element 340 is pulled up, and the optical compensation element 340 is deformed. At the same time, the brightness of the image light beam ILB2 generated by the second display area DA2 is twice the brightness of the image light beam ILB1 generated by the first display area DAL Then, during a second time interval T2, the voltage value of the control signal CTRL is pulled down, and the cross section of the optical compensation element 340 is restored to a rectangular shape. At the same time, the brightness of the image light beam ILB2 generated by the second display area DA2 is changed to be the same as the brightness of the image light beam ILB1 generated by the first display area DA1. In addition, the image capture device 320 and the light beam generator 330 are activated according to a signal EYET, and perform the eyeball tracking action. The synchronous signal SYNC and the signal EYET may also be generated by the controller 370.

It is worth mentioning that during the first time interval T1, through increasing the image light beam ILB2, the possible brightness difference caused by the absence of the image light beam at the position corresponding to the area ZA during the second time interval T2 may be compensated, and the quality of the displayed image may be effectively maintained.

In the embodiment, the frame period FR may correspond to a frequency of 120 Hz.

The controller 370 in the embodiment of the disclosure may be a processor with computing capability. Alternatively, the controller 370 may be a hardware circuit designed through a hardware description language (HDL) or any other digital circuit design method known to persons skilled in the art, and implemented through the form of a field programmable logic gate array (FPGA), a complex programmable logic device (CPLD), or an application-specific integrated circuit (ASIC).

Figure 4A:
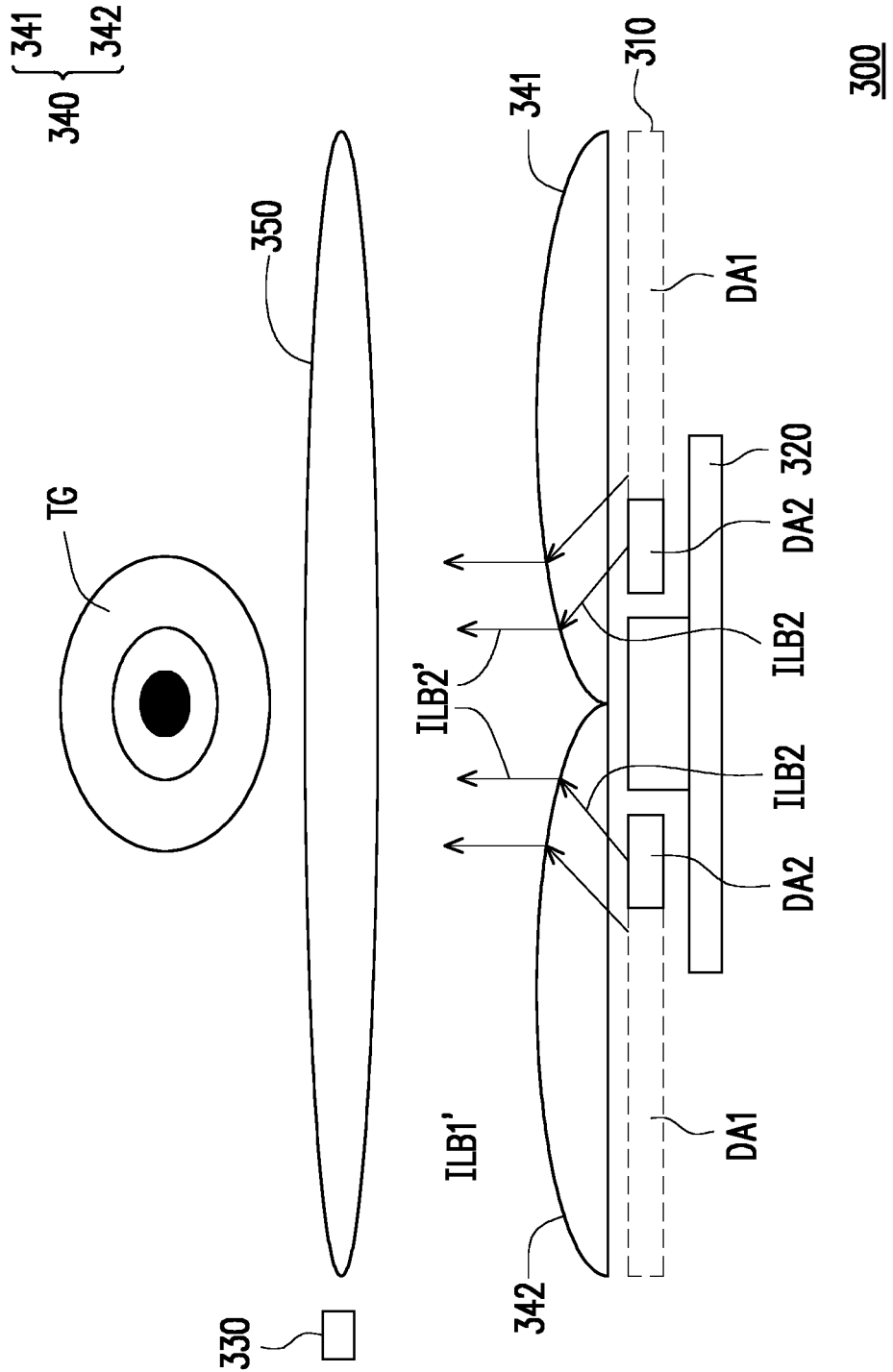
Figure 4B:
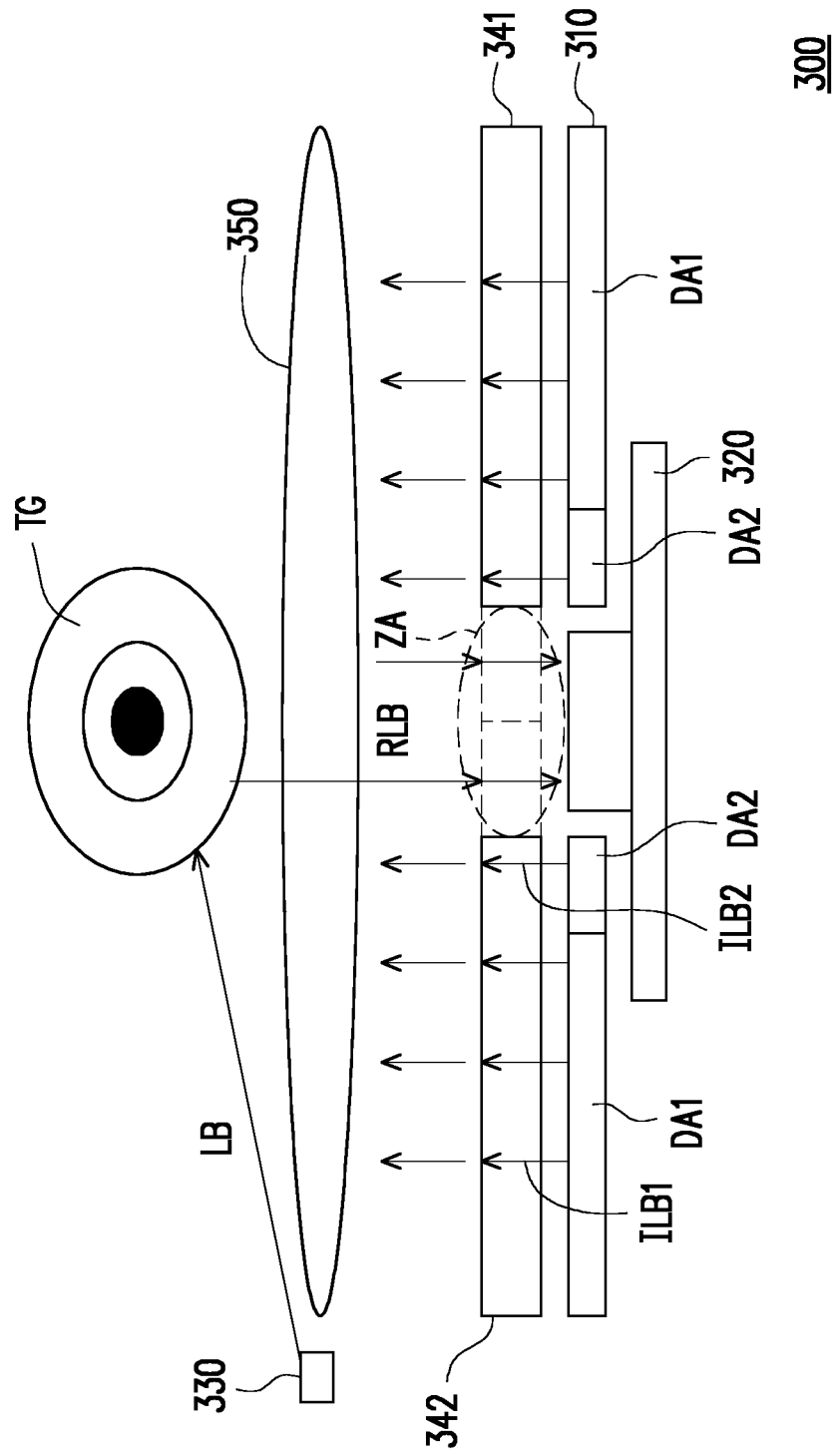

Please refer to FIG. 4A to FIG. 4C at the same time for the following. FIG. 4A to FIG. 4C are schematic diagrams of another action mode of the head mounted display according to an embodiment of the disclosure. The hardware architecture of the head mounted display of the present implementation is the same as that of the head mounted display 300 in FIG. 3A, and there will be no reiteration here. In FIG. 4A and FIG. 4C, based on the synchronous signal SYNC, during the first time interval T1 of the frame period FR, the first portion 341 and the second portion 342 of the optical compensation element 340 are deformed according to the pulled up control signal CTRL. At the same time, the first display area DA1 of the display 310 does not transmit the image light beam ILB1; and the second display area DA2 of the display 310 transmits the image light beam ILB2. The second portion 342 of the optical compensation element 340 adjusts the transmission path of the image light beam ILB2, and transmits the image light beam ILB2' to the target area TG.

In addition, in FIG. 4B and FIG. 4C, during the second time interval T2, the cross sections of the first portion 341 and the second portion 342 of the optical compensation element 340 are restored to rectangular shapes according to the pulled down control signal CTRL. The first display area DA1 and the second display area DA2 of the display 310 respectively transmit the image light beam ILB1 and the image light beam ILB2 with the same brightness.

At the same time, during the second time interval T2, the image capture device 320 and the light beam generator 330 may be activated according to the signal EYET, and execute the eyeball tracking action.

Figure 5A:
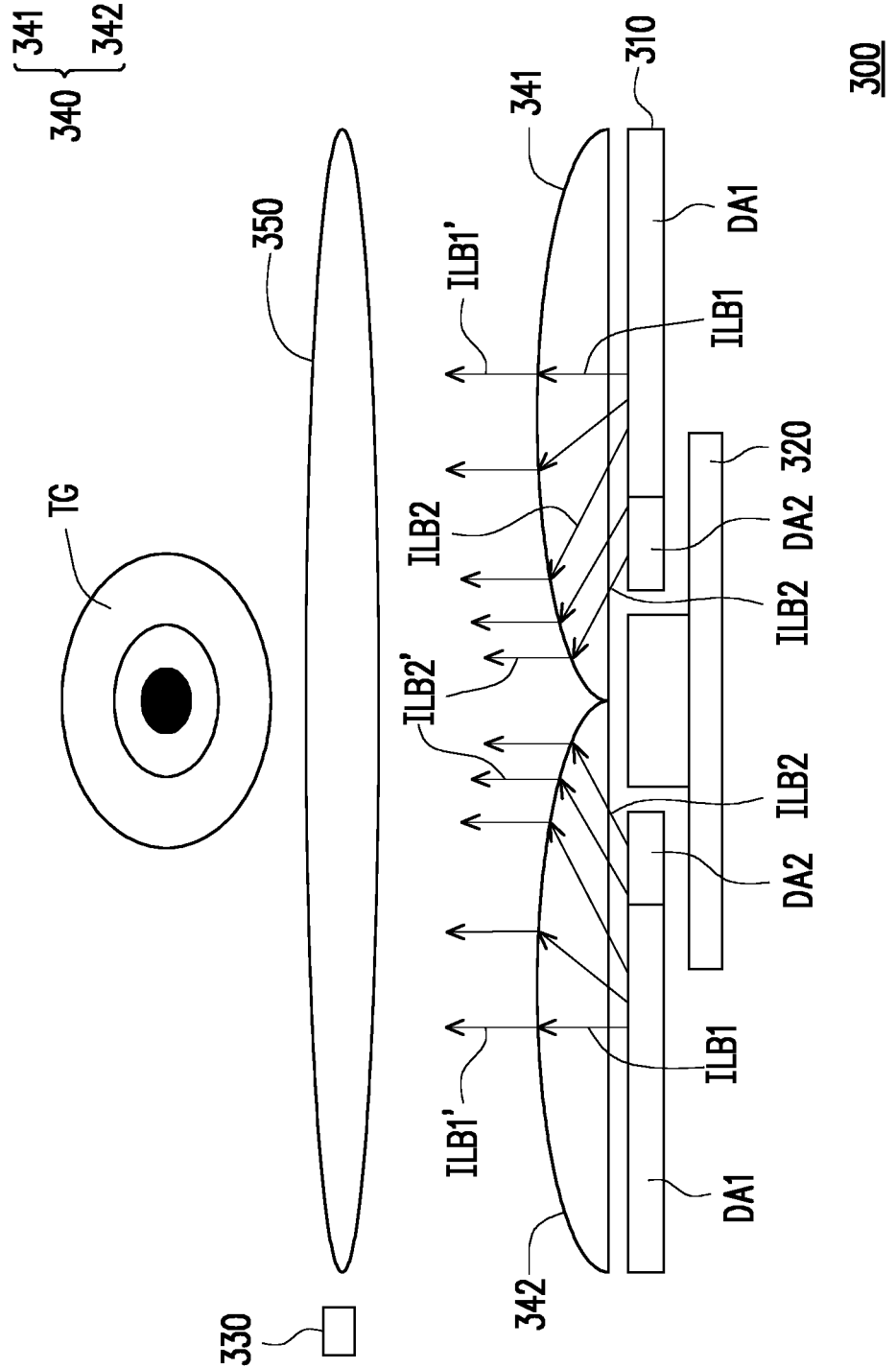
Figure 5B:
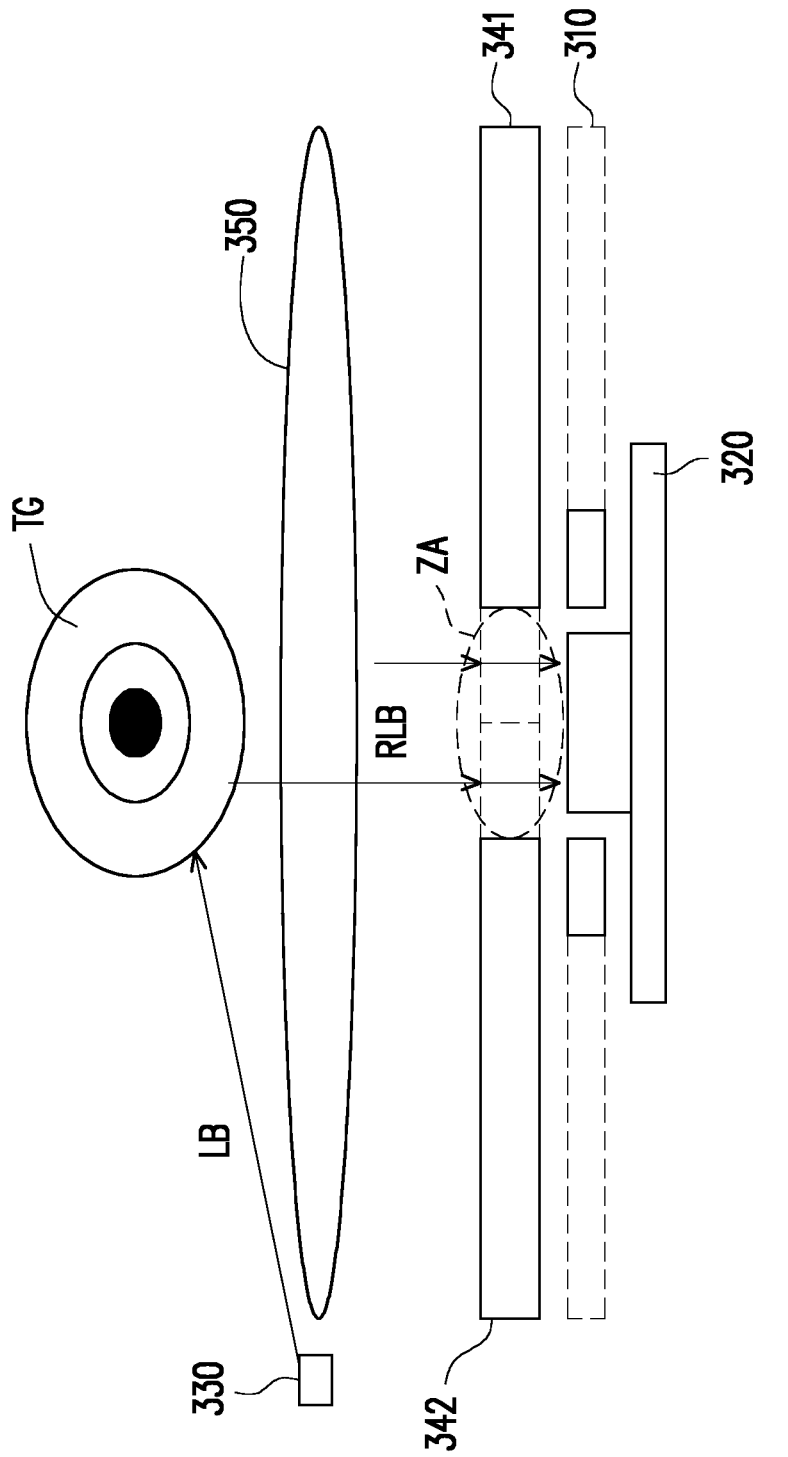

Please refer to FIG. 5A to FIG. 5C at the same time for the following. FIG. 5A to FIG. 5C are schematic diagrams of another action mode of the head mounted display according to an embodiment of the disclosure. The hardware architecture of the head mounted display of the present implementation is the same as that of the head mounted display 300 in FIG. 3A, and there will be no reiteration here. In FIG. 5A and FIG. 5C, based on the synchronous signal SYNC, during the first time interval T1 of the frame period FR, the first portion 341 and the second portion 342 of the optical compensation element 340 are deformed according to the pulled up control signal CTRL. At the same time, the first display area DA1 and the second display area DA2 of the display 310 transmit the image light beams ILB1 and ILB2 with the same brightness.

In addition, in FIG. 4B and FIG. 4C, during the second time interval T2, the cross sections of the first portion 341 and the second portion 342 of the optical compensation element 340 are restored to rectangular shapes according to the pulled down control signal CTRL. The first display area DA1 and the second display area DA2 of the display 310 stop transmitting the image light beams ILB1 and ILB2.

At the same time, during the second time interval T2, the image capture device 320 and the light beam generator 330 may be activated according to the signal EYET, and execute the eyeball tracking action.

Please refer to FIG. 6A to FIG. 6H for the following. FIG. 6A to FIG. 6H are respectively schematic diagrams of multiple configurations of a display, an image capture device, and an optical compensation element of the head mounted display according to an embodiment of the disclosure. In FIG. 6A, a display 611 of a head mounted display 601 is configured behind an optical compensation element 641 and has an open area OZ1. An image capture device 621 is disposed in the open area OZ1. In FIG. 6B, a head mounted display 602 has displays 612-1 and 612-2 configured behind an optical compensation element 642. There is a spacing area BZ1 between the displays 612-1 and 612-2. An image capture device 622 may be disposed in the spacing area BZ1. In the embodiment, the spacing area BZ1 is equivalent to the open area in the display. In FIG. 6C, a head mounted display 603 has displays 613-1 and 613-2 configured behind an optical compensation element 643. There is a spacing area BZ2 between the displays 613-1 and 613-2. The spacing area BZ2 and the spacing area BZ1 in the foregoing embodiment have different directions (for example, orthogonal to each other). The image capture device 623 may be disposed in the spacing area BZ2. In FIG. 6D, a head mounted display 604 has displays 614-1 to 614-4 configured behind an optical compensation element 644 in a 2×2 manner. A cross spacing area BZ3 is formed between the displays 614-1 to 614-4. The image capture device 624 may be disposed at the center position of the cross spacing area BZ3.

In FIG. 6E, a display 615 of a head mounted display 605 is configured behind an optical compensation element 645. The display 615 has an open area OZ1 and auxiliary open areas OZ2 and OZ3. The head mounted display 605 includes an image capture device 625 and auxiliary image capture devices 625-1 and 625-2. The image capture device 625 and the auxiliary image capture devices 625-1 and 625-2 are respectively disposed in the open area OZ1 and the auxiliary open areas OZ2 and OZ3.

In FIG. 6F, displays 616-1 and 616-2 of a head mounted display 606 are configured behind an optical compensation element 646. The displays 616-1 and 616-2 are arranged parallel to each other and form a spacing area BZ4. The head mounted display 606 includes an image capture device 626 and auxiliary image capture devices 626-1 and 626-2. The auxiliary image capture device 626-1, the image capture device 626, and the auxiliary image capture device 626-2 may be sequentially arranged in the spacing area BZ4.

In FIG. 6G, displays 617-1 and 617-2 of a head mounted display 607 are configured behind an optical compensation element 647. The displays 617-1 and 617-2 are arranged perpendicular to each other and form a spacing area BZ5. The head mounted display 607 includes an image capture device 627 and auxiliary image capture devices 627-1 and 627-2. The auxiliary image capture device 627-1, the image capture device 627, and the auxiliary image capture device 627-2 may be sequentially arranged in the spacing area BZ5.

In FIG. 6H, displays 618-1 to 618-4 of a head mounted display 608 are configured behind an optical compensation element 648 in a 2×2 manner. A cross-shaped spacing area BZ6 is formed between the displays 618-1 to 618-4. The head mounted display 608 includes an image capture device 628 and auxiliary image capture devices 622-1 to 628-4. The image capture device 628 and the auxiliary image capture devices 622-1 to 628-4 are distributed in the spacing area BZ6. In detail, the image capture device 628 is disposed in the center area of the spacing area BZ6, the auxiliary image capture devices 628-1 and 628-2 are disposed parallel to each other, and the auxiliary image capture devices 628-3 and 628-4 are disposed perpendicular to each other.

Figure 7:
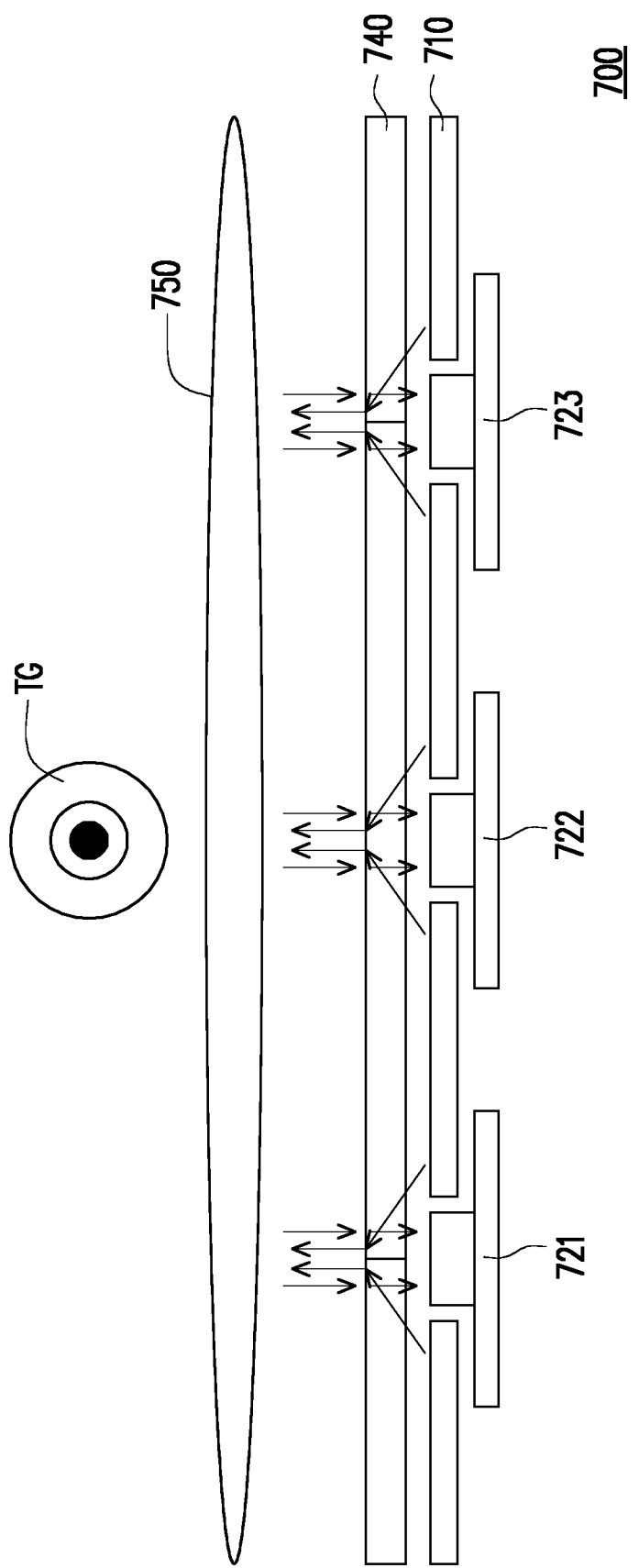
FIG. 7 is a schematic diagram of a head mounted display according to another embodiment of the disclosure.

Please refer to FIG. 7 for the following. FIG. 7 is a schematic diagram of a head mounted display according to another embodiment of the disclosure. In FIG. 7, a display 710 of a head mounted display 700 may have multiple open areas (such as an odd number of 3 or more) along a direction, which are configured to dispose multiple image capture devices 721 to 723. The image capture device 722 may be disposed at the center position corresponding to an optical compensation element 740 and directly facing the target area. The image capture devices 721 and 723 may be disposed on two sides of the image capture device 722. The image capture devices 721 and 723 may be used as auxiliary image capture devices.

In the embodiment, the curvature of the eyeball of the user may be calculated according to the target area images captured by the image capture devices 721 to 723 at different angles to optimize the effect of the eyeball tracking action.

Figure 8:
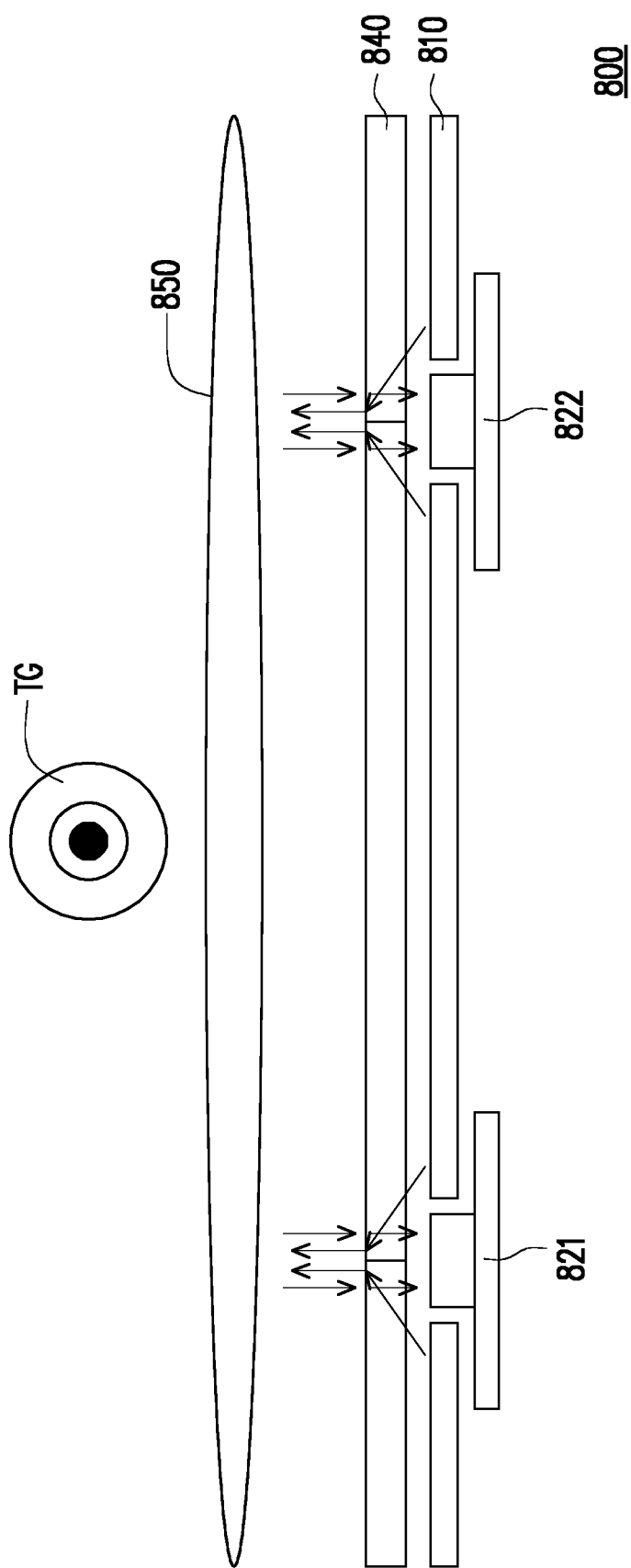
FIG. 8 is a schematic diagram of a head mounted display according to another embodiment of the disclosure.

Please refer to FIG. 8 for the following. FIG. 8 is a schematic diagram of a head mounted display according to another embodiment of the disclosure. In FIG. 8, a display 810 of a head mounted display 800 may have multiple open areas (such as an even number of 2 or more) along a direction, which are configured to dispose multiple image capture devices 821 to 822. In the embodiment, the center position corresponding to an optical compensation element 840 does not need to be disposed with an image capture device. The image capture devices 821 and 822 may be disposed on two sides corresponding to the target area TG. The image capture devices 821 and 822 may capture the target area images at different angles, which may be used as the basis for calculating the curvature of the eyeball of the user.

In summary, the disclosure provides the optical compensation element, which enables the image light beam for display and the reflection light beam as the basis for eyeball tracking to be respectively transmitted to the target area and the image capture device without mutual interference. In this way, without reducing the display effect, the head mounted display may still perform the eyeball tracking action with high accuracy to improve the overall performance.

What is claimed is:

1. A head mounted display, comprising:
    at least one display, having an open area and generating at least one image light beam;
    a first image capture device, disposed by overlapping with the at least one display corresponding to the open area and configured to capture a target area image on a target area through the open area;
    a light beam generator, configured to project at least one light beam to the target area, wherein the target area reflects the at least one light beam to generate at least one reflection light beam; and
    an optical compensation element, disposed between the at least one display and the target area, and configured to convert a transmission direction of the at least one image light beam and enable the at least one reflection light beam to be directly transmitted to the first image capture device,
    wherein the optical compensation element does not change a transmission path of the at least one reflection light beam reflected by the target area,
    wherein when a number of the at least one display is multiple, at least one spacing area is formed between a plurality of displays, the head mounted display further comprising:
    a plurality of second image capture devices, corresponding to the at least one spacing area, disposed by overlapping with the display; and capturing a plurality of target area images on the target area respectively through the at least one spacing area.

2. The head mounted display according to claim 1, wherein the optical compensation element is a diffractive optics element.

3. The head mounted display according to claim 2, wherein the at least one display comprises a first display and a second display; and the diffractive optics element comprises a first portion and a second portion respectively relative to the first display and the second display.

4. The head mounted display according to claim 2, wherein the optical compensation element is a dynamic refractive optics element, controlled by a control signal and configured to:
    enable a first portion of the first surface and a second portion of the first surface to be both curved surfaces and enable a first portion of the second surface and a second portion of the second surface to be both planes during a first time interval, wherein the first portion of the first surface and the second portion of the first surface face the target area; and
    enable the first portion of the first surface, the second portion of the first surface, the first portion of the second surface, and the second portion of the second surface to be all planes during a second time interval.

5. The head mounted display according to claim 4, wherein the first image capture device stops capturing the target area image during the first time interval; and the light beam generator is activated, and the first image capture device is activated to capture the target area image during the second time interval.

6. The head mounted display according to claim 4, wherein each of the first display and the second display has a first display area and a second display area, wherein:
    a brightness of the second display area is twice a brightness of the first display area during the first time interval; and
    the brightness of the second display area is equal to the brightness of the first display area during the second time interval.

7. The head mounted display according to claim 4, wherein each of the first display and the second display has a first display area and a second display area, wherein:
    the second display area is lit and the first display area is not lit during the first time interval; and
    a brightness of the second display area is equal to a brightness of the first display area during the second time interval.

8. The head mounted display according to claim 4, further comprising a controller, configured to generate the control signal.

9. The head mounted display according to claim 1, wherein the at least one display further has a plurality of auxiliary open areas, the head mounted display further comprising:
 a plurality of second image capture devices, respectively corresponding to the plurality of auxiliary open areas, disposed by overlapping with the display; and capturing a plurality of target area images on the target area respectively through the plurality of auxiliary open areas.

* * * * *